United States Patent [19]

Olsen et al.

[11] 4,165,652

[45] Aug. 28, 1979

[54] VIBRATABLE-WIRE INSTRUMENT HAVING AN IMPROVED TEMPERATURE COMPENSATING TECHNIQUE

[76] Inventors: Everett O. Olsen, 54 Creek St., Wrentham, Mass. 02093; James R. La Croix, 89 Oakcrest Dr., North Attleboro, Mass. 02760; Donald C. Simpson, 172 S. Washington St., Norton, Mass. 02766

[21] Appl. No.: 911,869

[22] Filed: Jun. 2, 1978

[51] Int. Cl.² ............................. 73 717; G01L 7/08; G01L 9/00
[52] U.S. Cl. .................................. 73/704; 73/708
[58] Field of Search ........... 73/704, 708, 717, DIG. 1, 73/32 A, 59, 497

[56] References Cited

U.S. PATENT DOCUMENTS

| | | | |
|---|---|---|---|
| 2,455,021 | 11/1948 | Rieber | 73/708 |
| 3,393,565 | 7/1968 | Klee | 73/704 |
| 3,603,137 | 9/1971 | Banks | 73/32 A |
| 3,788,134 | 1/1974 | Meier | 73/DIG. 1 |

*Primary Examiner*—James J. Gill

[57] ABSTRACT

A differential-pressure measuring instrument includes a pair of diaphragms each subject to a respective fluid pressure. The diaphragms enclose a sealed chamber containing a fill-liquid surrounding a non-magnetic vibratable-wire which is tensioned in accordance with the applied differential pressure.

A temperature compensating inductor is connected in parallel with the vibratable-wire to compensate for variations in the vibrating frequency of the wire due to changes in the viscosity of the fill-liquid with temperature.

16 Claims, 13 Drawing Figures

VIBRATABLE-WIRE INSTRUMENT HAVING AN IMPROVED TEMPERATURE COMPENSATING TECHNIQUE

BACKGROUND OF THE INVENTION

1. Field of the Invention

This invention relates to fluid measuring instruments using a vibratable-wire as the basic force-sensing element. More particularly, this invention relates to compensating the vibration frequency of the wire for changes in ambient temperature.

2. Description of the Prior Art

The use of a vibratable-wire as the basic sensing element for pressure-responsive instruments has been often proposed by the prior art. Such proposals were based on the understanding that the frequency of wire vibration was closely related to the tension in the wire and, the recognition that the wire tension could in turn be controlled by a differential pressure to be measured. Thus, the frequency of wire vibration could be developed as a measurement signal responsive to differential pressure.

One such instrument is set forth in copending application Ser. No. 834,481, filed by E. O. Olsen et al, on Sept. 19, 1977. Here, the vibratable-wire is contained in a liquid-filled tube. While this instrument is suited for most industrial applications, it is less effective in applications involving extreme changes in ambient temperature. This is due to the effects of variations in the viscosity of the fill-liquid with changes in ambient temperature on the frequency of vibration, and thus on the accuracy of the pressure measurement.

Typically, viscosity increases with decreasing temperatures. Increases in viscosity result in a proportional reduction of the vibration frequency. Essentially, this is due to the fact that as the temperature decreases the liquid molecules become more viscous. The more viscous the liquid molecules, the more they adhere to the vibratable-wire thereby effectively increasing the mass of the wire. Since the vibrating frequency is inversely related to the mass of the wire, an increase in viscosity, other things being equal, decreases the frequency. The effect is greatly exhibited at the low end of the industrial temperature range (i.e., $-40°$ C. to $+25°$ C.). For example, liquid viscosity may change by 200% to 300% when the temperature drops from room temperature to $-40°$ C.

To reduce these temperature-dependent effects, the above mentioned application teaches the use of a fill-liquid characterized by (1) having a low room temperature viscosity and (2) a low viscosity temperature coefficient. While these compensating techniques are effective for most industrial applications, there remains some residual error due to extreme changes in ambient temperature.

SUMMARY OF THE INVENTION

The present invention provides, in a preferred embodiment, a general purpose differential-pressure measuring instrument comprising a main body with a pair of diaphragms each subject to a respective fluid pressure. The diaphragms enclose a sealed chamber containing a fill-liquid surrounding a vibratable-wire which is tensioned in accordance with the applied differential pressure. A magnetic field passes transversely through the wire, and an electrical current is supplied to the wire to produce a vibratory force on the wire as a result of interaction between the electrical current and the magnetic field. A temperature compensating inductive element is coupled across the vibratable-wire to compensate for variations in the vibrating frequency of the wire due to changes in the viscosity of the fill-liquid with temperature.

Accordingly, it is a principal object of this invention to provide a pressure measuring instrument of the vibratable-wire type which is relatively insensitive to variations in the viscosity of the fill-liquid with temperature. Other important objects aspects and advantages of the invention will in part be pointed out in, and in part apparent from, the following description together with the accompanying drawings.

DESCRIPTION OF THE PREFERRED EMBODIMENT

Figure 1:
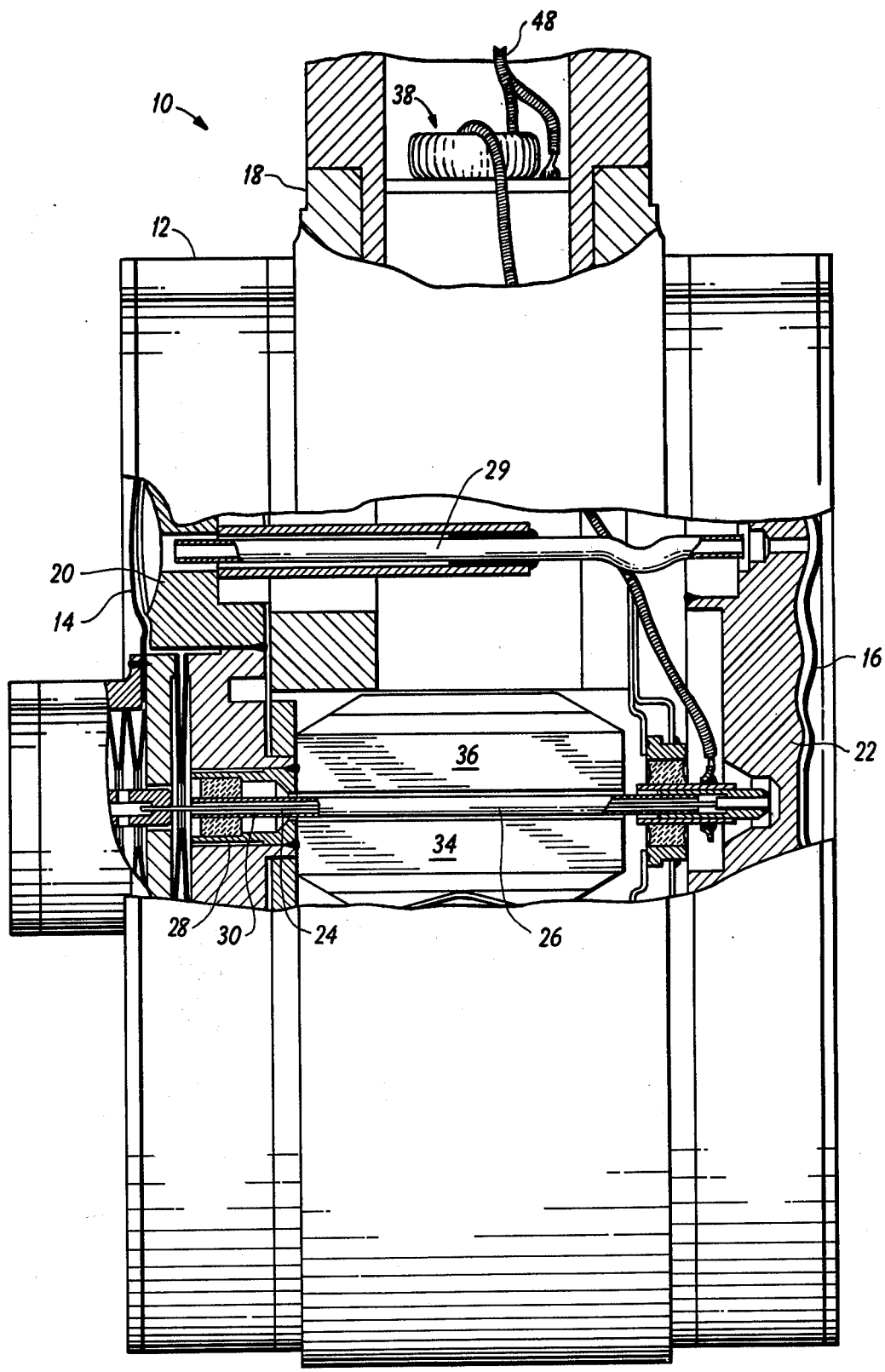
FIG. 1 illustrates a cut-away view of the body assembly of the present invention.

Referring now to the drawings, FIG. 1 shows a cut-away view of a differential-pressure measuring instrument 10 whose function operation is identical to that instrument disclosed in copending application Ser. No. 834,481, filed by E. O. Olsen et al, on Sept. 19, 1977. That copending application describes the instrument in detail, and thus the following description will refer only to those elements required for an understanding of the present invention. Reference should be made to the above-mentioned copending application for specific information concerning further aspects of the instrument.

The instrument 10 includes a body assembly 12 having diaphragms 14 and 16 mounted on opposite sides thereof. The diaphragm 14 is a so-called range diaphragm having a predetermined spring rate. The diaphragm 16 has a very low spring rate, and is essentially a slack diaphragm. The two fluid pressures to be measured are separately conducted to the respective diaphragms by the usual means (not shown) for differential pressure instruments.

The body assembly 12 includes a central section 18 having secured thereto solid back-up plates 20 and 22 for the diaphragms 14 and 16, respectively. The back-up plates 20 and 22 present carefully shaped diaphragm support surfaces precisely matching the shapes to the associated diaphragms 14 and 16, and thus provides a stable support for those diaphragms in the event of an over-range pressure condition forcing either diaphragm against its associated back-up plate.

A vibratable wire 24 of round cross-section and having a small diameter extends centrally through interior spaces with the central section 18 and the back-up plates 20 and 22.

A small diameter elongate tube 26 surrounds the wire 24 throughout much of its length. The right-hand end of the tube 26 is closed, and the corresponding end of the wire 24 is secured to the closed end. The left-hand of the wire 24 is secured to the range diaphragm. The left-hand end of the tube 26 is supported by a cylindrical insulator sleeve 28, which in turn is secured through associated parts to the left-hand back-up plate 20.

When the instrument is within its normal range of operation, the back-up plates 20 and 22 define enclosed regions, together with other internal cavity regions within the body assembly 12, including the interior of the tube 26, and the communication cavity 29 between the diaphragms 14 and 16 form a sealed internal chamber which is filled with a fill-liquid 30.

Figure 6:
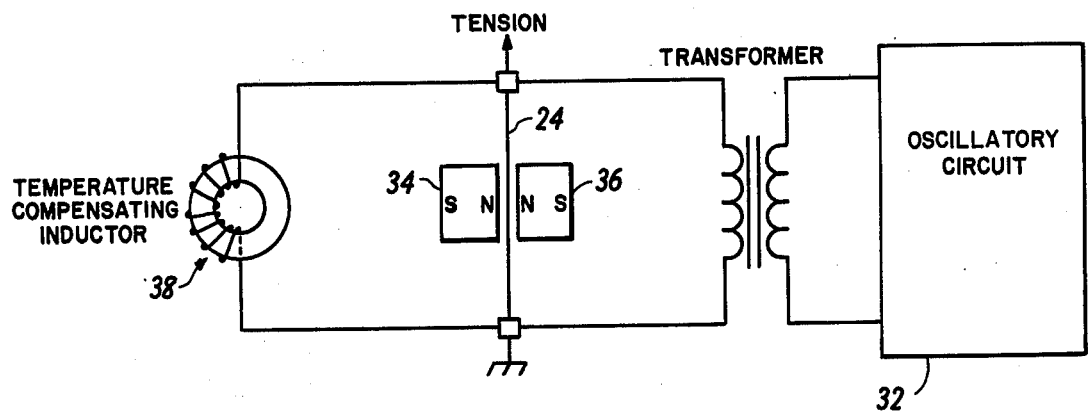
FIG. 6 illustrates, in schematic form, the placement of the temperature compensating inductor.

In order to induce vibration of the wire 24, its ends are connected to an oscillatory circuit 32, arranged to produce an alternating flow of current in the wire 24, as shown in FIG. 6. The operation of the oscillatory circuit 32 is disclosed in detail in copending application Ser. No. 732,129, filed by E. O. Olsen et al, on Oct. 13, 1976, and as such will not be described herein.

Two side-by-side permanent magnets 34, 36 are positioned on opposite sides of the tube 26, closely adjacent thereto. These magnets develop a steady magnetic field through the wire 24 and perpendicular to the wire axis. The interaction between the oscillatory wire current and the magnetic flux produce lateral forces on the wire 24 causing it to vibrate. The wire 24 and the tube 26 are perferably made of non-magnetic materials to assure that these lateral vibratory forces are properly developed.

When the instrument 10 is used to measure the difference between fluid pressures, the lower pressure is applied against the range diaphragm 14 and, the higher fluid pressure is applied against the right hand diaphragm 16. The range diaphragm will develop a net force proportional to the differential pressure to be measured. This net force is applied as a tensioning force to the wire 24 to control the frequency of vibration of the wire in accordance with well established physical laws. In this manner, the vibration frequency becomes a measure of the differential pressure to be measured.

As mentioned previously, and as illustrated in FIG. 2, the viscosity of the fill-liquid 30 will increase with decreasing temperatures. Increases in viscosity will result in a reduction in wire vibration frequency since the liquid molecules becomes more viscous, the more they adhere to the vibratable-wire 24, effectively increasing its mass. Since the vibration frequency is inversely related to the mass of the wire 24, an increase in viscosity thus can be understood to decrease the frequency of wire vibration, other things being equal. This viscosity-temperature dependency produces errors in the measurement, especially in the temperature range from room temperature to −40° C., where viscosity may vary 200-300%.

Figure 3:
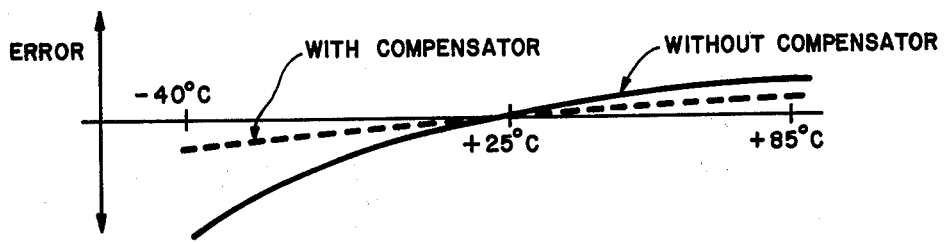
FIG. 3 is a temperature error curve.

The error introduced by changes in fill-liquid viscosity is illustrated by the curved solid line of FIG. 3. As can be seen, the error is the greatest in the temperature range of room temperature (+25° C.) to −40° C.

Figure 4:
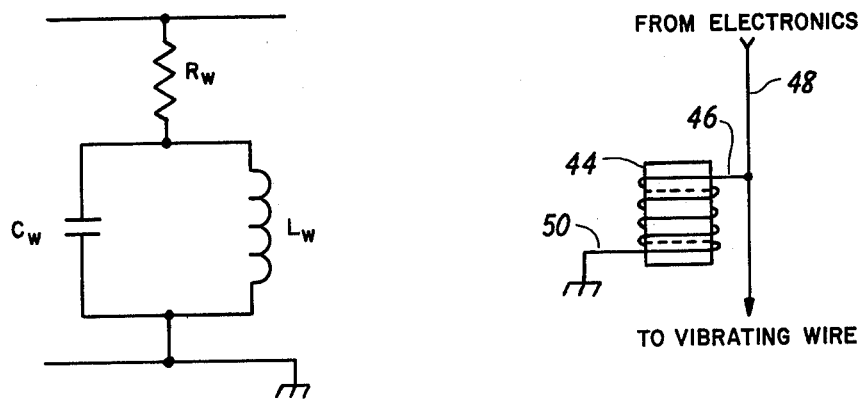
FIG. 4 illustrates, in schematic form, the equivalent electrical circuit of a vibratable-wire.
Figure 5:
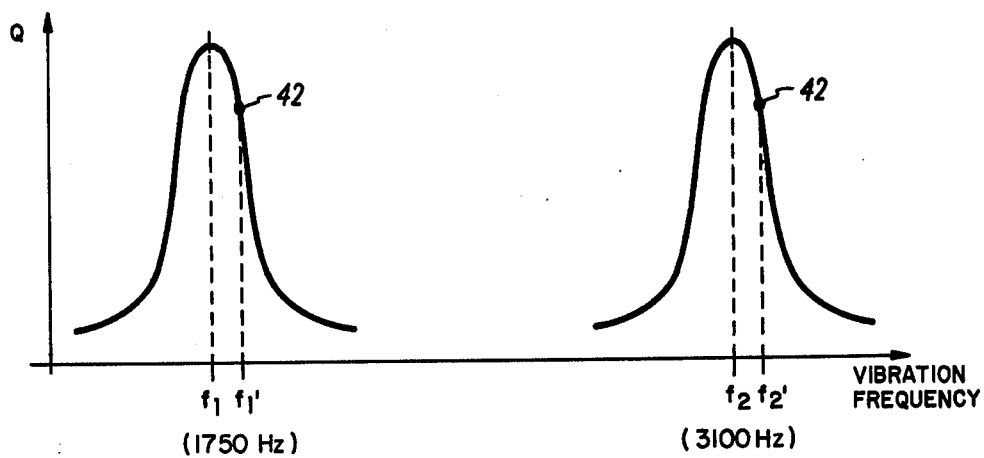
FIG. 5 illustrates the relationship of vibration frequency with tension.

Theoretically, a vibratory wire may be thought of as an LC tank circuit in series with an intrinsic resistance element (Rw) as shown in FIG. 4. The frequency of vibration is related by known physical laws to the tension and mass of the wire, and thus to the values of Lw and Cw, everything else being equal. In the preferred embodiment, the fill-liquid 30 has a viscosity of 1 centistoke at 25° C. As shown in FIG. 5, in the preferred embodiment and with everything else being equal, the resonant frequency of the wire 24 is typically 1750 Hz, ($f_1$), at the low limit of wire tension and, is 3100 Hz, ($f_2$), at the upper end of wire tension.

Figure 2:
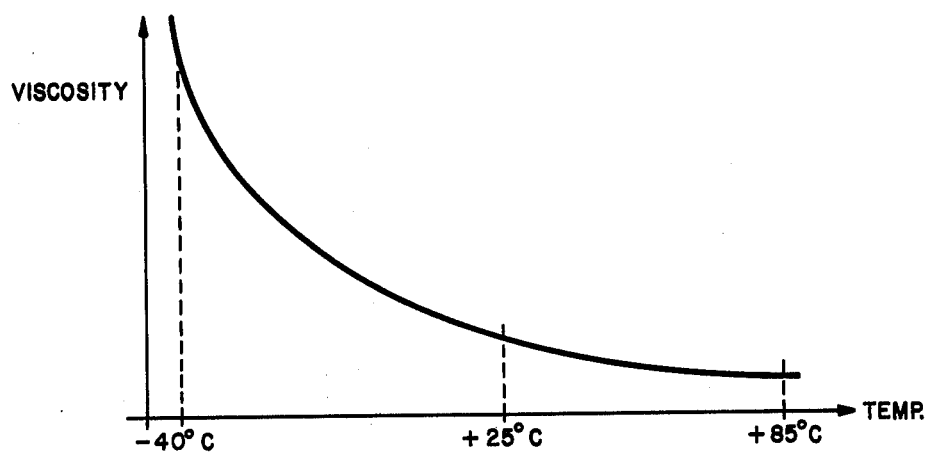
FIG. 2 illustrates the characteristic curve of viscosity with changing temperature.

To overcome the changes in the frequency of vibration with ambient temperature, a temperature compensating element, such as the inductor 38, is coupled in parallel with the vibratable-wire 24, as shown schematically in FIG. 6. The compensating element, as will be further discussed, in chosen to have value and a temperature coefficient opposite to and matching the changes in viscosity of the fill-liquid 30, with temperature. As shown in FIG. 2, the viscosity curve is highly non-linear between the temperature range +25° C. to −40° C., and as such, the compensating effect of the temperature compensating element in this range must also be highly non-linear.

Figure 7B:
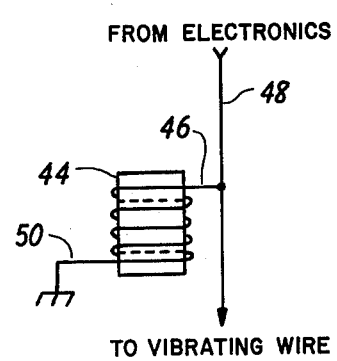
FIG. 7B illustrates an embodiment of the inductor of the present invention.
Figure 7A:
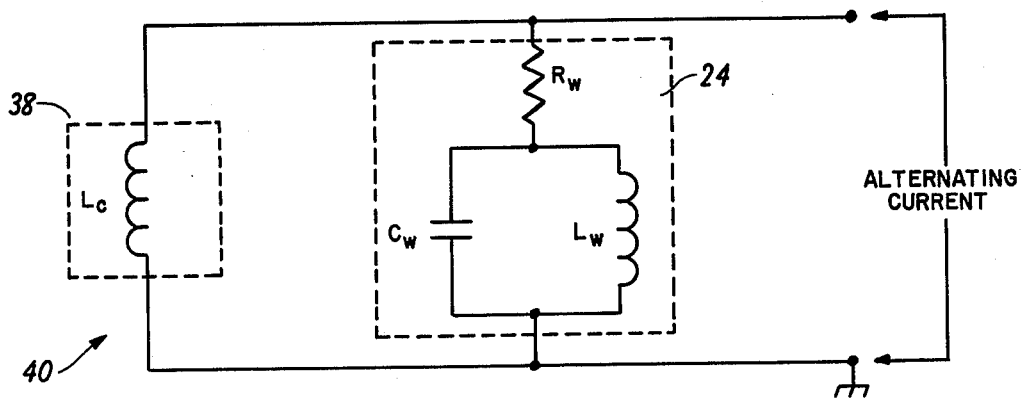
FIG. 7A illustrates, in schematic form, the equivalent circuit of the temperature compensating industor in parallel with the vibratable-wire.

FIG. 7A illustrates, in schematic form, the equivalent circuit 40 for the vibratable-wire 24 in parallel with the inductor 38. The vibratable-wire 24 will vibrate at a frequency determined by:

$$f_v \approx \frac{1}{2\pi} \sqrt{\frac{1}{L_W C_W}} \quad (1)$$

where: $L_W$, $C_W$ are the intrinsic inductance and capacitive elements of the vibratable-wire 24.

when the inductor 38 is placed in parallel with the vibratable-wire 24 the frequency of vibration will change, everything else being equal, as shown at 42 in FIG. 5. This new frequency, ($f_1^1$, $f_2^1$), of vibration is defined by:

$$f_c \approx \frac{1}{2\pi} \sqrt{\frac{1}{L_T C_W}} \quad (2)$$

Where: $L_T$ is the parallel combination of $L_C$ and $L_W$; and, where: $L_C$ is the value of the inductor 38.

The inductor 38 is chosen to have value, $L_C$, and an inductance temperature coefficient to maintain the product $L_T C_W$, and thus the frequency of vibration substantially constant with variations in viscosity due to changes in ambient temperature.

The preferred embodiment of the inductor 38 is shown schematically in FIG. 7B. The inductor 38 includes a torroidal core 44 wrapped by 5 turns of number 18 copper wire. One lead wire 46 of the inductor 38 is connected to cable 48 which couples the electronic circuitry (not shown) and the oscillatory 32 to the vibratable-wire 24. The other lead wire 50 of the vibratable-wire 24 is connected to system ground.

The value, $L_C$, of the inductor 38 is defined by the physical dimensions of the core 44, the initial permeability ($\mu_o$) of the material from which the core 44 is manufactured, and the number of windings, by known physical laws. The inductance temperature coefficient of the inductor 38 is related to the permeability temperature coefficient of the core material. As previously stated, the viscosity temperature characteristic is highly non-linear from +25° C. to −40° C. Thus, as illustrated in FIG. 3, the greatest error is negative and occurs from +25° C. to −40° C.

To compensate for this error, the core material is selected to have a permeability temperature coefficient which is positive from −40° C. to +25° C. and, the value, $L_C$, of the inductor 38 is selected such that the change $\Delta L_C/°C$. is effectively equal $\Delta C_W L_W/°C$. thereby maintaining the product $L_T C_W$ substantially constant.

Also, it has been found that by properly selecting the value and temperature coefficient of the temperature compensating element, a single temperature compensating element can be used with a wide range of vibratable-wire geometries. This is due primarily to the relative effect of viscosity on the error-temperature coefficient of the vibratable-wire with changes in the geometry, of the vibratable-wire. Thus, since the value of the $L_W C_W$ product is also geometry related, the temperature compensating element also compensates for variations in vibratable-wire geometry with changes in ambient temperature. By maintaining the product $L_T C_W$ substantially temperature independent, as shown by Equation (2), the frequency of vibration of the wire 24 is also maintained substantially temperature independent.

Figure 8:
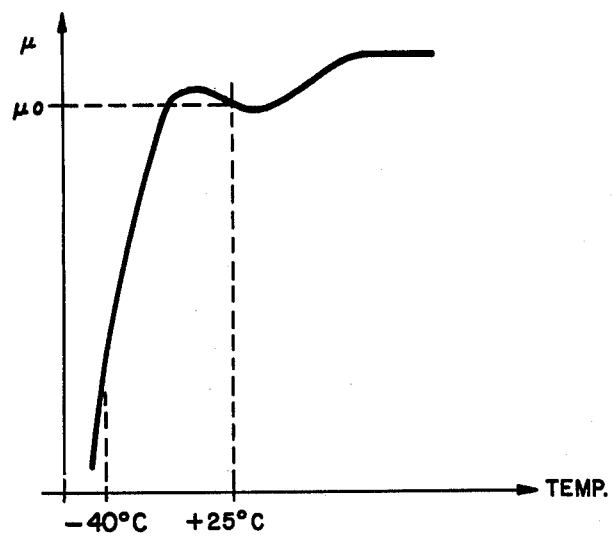
FIG. 8 illustrates the typical characteristic curve of permeability for a ferrite material with temperature.

Preferably, the core 44 is made of a Ferrite material having a permeability temperature coefficient as shown in FIG. 8. One such material is sold under the designation 3E3 by Phillips, Nederland, B. V. FIG. 3 illustrates, along the dotted curve line, the compensated error curve obtained with the present invention.

ALTERNATE EMBODIMENTS

As shown in FIGS. 9A, 9B, 10A and 10B the equivalent circuit of the inductor 38 can be changed by varying the coupling of the inductor 38 to cable 48 and passing the cable 48 through the center of the core 44.

Figures 9A, 9B:
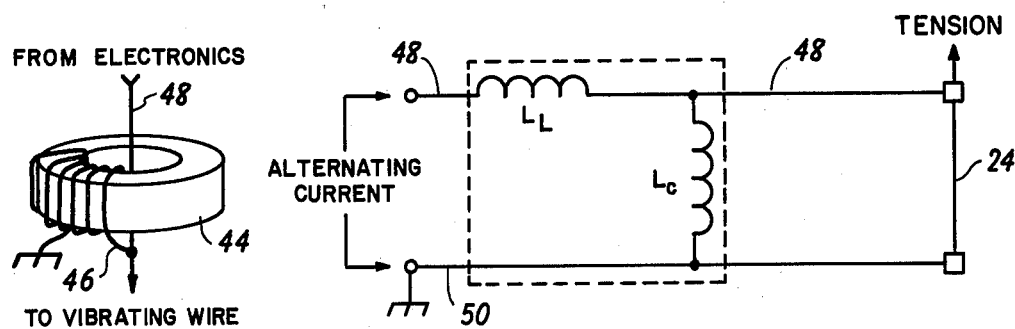
FIG. 9A illustrates an alternate embodiment of the inductor of the present invention.
FIG. 9B illustrates in schematic form, the equivalent circuit of the alternate inductor in parallel with the vibratable-wire.

FIGS. 9A and 9B illustrate the effect of connecting the lead wire 46 to the cable 48 after the cable 48 has passed through the core 44. An inductor, $L_L$, is generated in series with the parallel combination of $L_C$ and the Vibratable-wire 24.

Figures 10A, 10B:
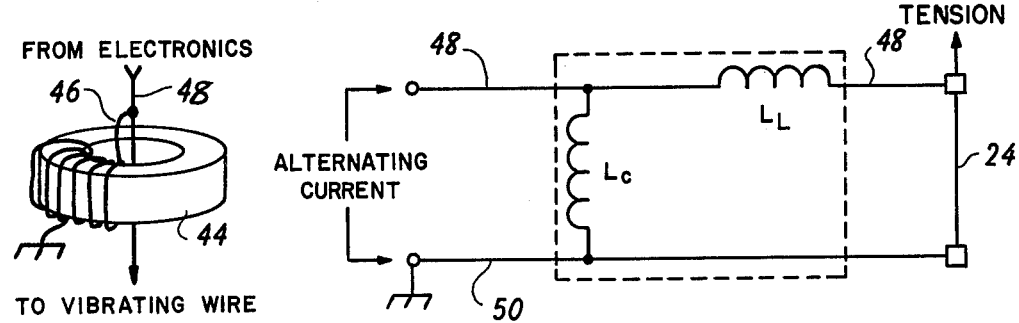
FIG. 10A illustrates a further embodiment of the inductor of the present invention.
FIG. 10B illustrates, in schematic form, the equivalent circuit of the inductor in FIG. 10A in parallel with the vibratable-wire.

As shown in FIGS. 10A and 10B, the inductor $L_L$ can also be connected in the circuit leg connecting the inductor 38 to the wire 24.

In both of the aforementioned techniques of coupling the inductor 38, the generated inductor $L_L$ acts as an autotransformer which can be utilized to produce sharper peaks on the resonant curves of FIG. 5, that is, to improve the Q of the vibrating-wire 24 equivalent circuit.

Also, although only one embodiment of the temperature compensating element (i.e., an inductor) has been illustrated and described in detail other embodiments may be obvious to one skilled in the art. Any device having a non-linear characteristic temperature curve which is opposite and matchable to the viscosity/temperature curve may be utilized. Examples of such devices are (1) another vibratable-wire and (2) a temperature sensitive capacitor.

While only one embodiment of the present invention has been illustrated and disclosed in detail, the invention is not to be considered limited to the precise constructions shown. Various adaptations, modifications and uses of the invention may occur to those skilled in the art to which the invention pertains and the invention is to cover are such adaptations, modifications and uses which fall within the spirit and scope of the appended claims.

What is claimed is:

1. For use in a pressure measurement instrument having a diaphragm arranged to receive an applied pressure the magnitude of which is to be measured, a liquid-surrounded vibratable-wire coupled to said diaphragm and the tension on which is varied in relation to the magnitude of said applied pressure, and wherein said liquid has a first characteristic temperature effect on the vibration frequency of said vibratable-wire, an apparatus comprising:

a temperature compensating inductive element coupled in parallel with said vibratable-wire and having a second characteristic temperature coefficient on said vibration frequency opposite to and matching said first temperature effect such that the combined effect of said first and second coefficients on said vibration frequency is substantially zero.

2. For use in a differential pressure measurement instrument including a vibratable-wire, a liquid surrounding said vibratable-wire, first and second spaced diaphragms each arranged to receive a respective pressure the differential of which is to be measured by varying the tension on said vibratable-wire and wherein the vicosity of said liquid has a first characteristic temperature effect on the vibration frequency, an apparatus comprising:

a temperature compensating inductive element coupled in parallel with said vibratable-wire and formed about a toroidal core made of a ferrite material such that the inductance temperature coefficient effect of said inductive element on said vibration frequency is opposite to and substantially cancels the said first characteristic temperature effect thus maintaining the vibration frequency for a given tension, substantially constant with temperature.

3. The apparatus according to claim 2 wherein the compensating effect of said temperature compensating inductive element on said vibration frequency is substantially insensitive to variations in geometry of said vibratable-wire.

4. The apparatus according to claim 2 wherein said temperature compensating inductive element is formed as an autotransformer.

5. An instrument for developing a measurement signal responsive to an applied differential pressure comprising;
   (a) a body assembly defining a chamber;
   (b) first and second spaced diaphragms closely adjacent respective sides of the body assembly and sealing the chamber;
   (c) said diaphragms being arranged to receive respective fluid pressure the differential of which is to be measured;
   (d) a vibratable-member extending within the chamber and having one end coupled to the first diaphragm and another end coupled in fixed relation to the body assembly;

(e) a fill-liquid enclosed in the chamber for providing liquid communication between said diaphragms, said fill-liquid being pressurized in response to said applied differential pressure whereby the first diaphragm will develop a tension in the vibratable-member to effect a vibration frequency indicative of the magnitude of the applied differential pressure;

(d) a temperature compensating element coupled to said vibratable-member, and;

(f) wherein said fill-liquid has a characteristic effect with temperature on said vibration frequency in a first direction and said temperature compensating element has a characteristic effect with temperature in a second direction opposite to and matching said characteristic effect of the fill-liquid such that the combined characteristic effects with temperature on the vibration frequency is substantially zero.

6. The instrument according to claim 5 wherein said vibration-member comprises a wire.

7. The instrument according to claim 6 wherein said wire is non-magnetic.

8. The instrument according to claim 5 wherein said characteristic effect with temperature of the fill-liquid is due to changes in fill-liquid viscosity with temperature.

9. The instrument according to claim 5 wherein said temperature compensating element is an inductive element coupled in parallel with said vibratable-member.

10. The instrument according to claim 9 wherein said inductive element includes a ferrite toroidal core having a permeability temperature coefficient characterized as being highly non-linear with temperature for temperatures below room temperatures.

11. The instrument according to claim 5 where;
(a) said vibratable-member compriese a wire having intrinsic inductance and capacitance elements defining said vibration frequency at a given applied differential pressure;
(b) said fill-liquid characteristic effect on said vibration frequency is due to the highly non-linear effects of fill-liquid viscosity with temperature on said intrinsic element of said wire; and,
(c) said temperature compensating element comprises an inductive element having a inductance temperature coefficient which is characterized as having a highly non-linear inductance temperature coefficient.

12. The instrument according to claim 5 wherein said temperature compensating element is an inductive element formed as an autotransformer.

13. In an instrument for measuring differential pressure and including first and second spaced diaphragms, a vibratable-wire, a liquid surrounding said vibratable-wire and having a characteristic effect with temperature on the vibration frequency in a first direction, the improvement comprising a temperature compensating inductive element coupled in parallel with the vibratable-wire and having an inductance temperature coefficient opposite to and matching said fill-liquid characteristic effect such that the combined characteristic effects on vibration frequency is substantially zero.

14. An instrument for developing a measurement signal responsive to an applied pressure, comprising:
(a) first and second diaphragms each arranged to receive a respective pressure the differential of which is to be measured;
(b) first and second diaphragm support means each positioned closely adjacent the interior surface of a corresponding diaphragm to establish first and second enclosed regions;
(c) an elongate tubular member having one end integral with said first diaphragm support means such that the interior of said member is in communication with said first and second enclosed regions, said tubular member extending outwardly from said first diaphragm support means to a fixedly supported closed end;
(d) a vibratable-wire extending through said tubular member and coupled between said first diaphragm and the closed end of said tubular member so that said applied differential pressure between said diaphragms will develop a tension in said wire;
(e) a fill-liquid for providing liquid communication between said first and second enclosed regions and the interior of said tubular member, said fill-liquid being pressured in response to said applied differential pressure whereby said diaphragms will develop a tension in said wire to effect a vibrating frequency of said wire indicative of the magnitude of said differential pressure;
(f) a temperature compensating inductive element coupled in parallel with said vibratable-wire; and,
(g) wherein said fill-liquid has a first characteristic effect with temperature on said vibration frequency and said inductive element has a second characteristic effect with temperature on said vibration frequency opposite to and matching said first characteristic effect such that the combined characteristic effects with temperature on said vibration frequency is substantially zero.

15. The instrument according to claim 14 wherein said temperature compensating inductive element is formed about a toroidal core made of a ferrite material.

16. The instrument according to claim 14 wherein said temperature compensating inductive element is substantially insensitive to variations in the geometry of said vibratable-wire and is formed as an autotransformer.

* * * * *

UNITED STATES PATENT OFFICE
CERTIFICATE OF CORRECTION

Patent No. 4,165,652          Dated August 28, 1979

Inventor(s) Everett O. Olsen, James R. LaCroix, Donald C. Simpson

It is certified that error appears in the above-identified patent and that said Letters Patent are hereby corrected as shown below:

In the caption, insert --(73) Assignee:

The Foxboro Company, Foxboro, Mass.--

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*